(12) United States Patent
Ma et al.

(10) Patent No.: US 12,494,544 B2
(45) Date of Patent: Dec. 9, 2025

(54) CELL FIXING APPARATUS AND BATTERY MODULE

(71) Applicant: Huawei Digital Power Technologies Co., Ltd., Shenzhen (CN)

(72) Inventors: Ruisheng Ma, Shanghai (CN); Jiafei Shi, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 556 days.

(21) Appl. No.: 17/987,144

(22) Filed: Nov. 15, 2022

(65) Prior Publication Data

US 2023/0155239 A1    May 18, 2023

(30) Foreign Application Priority Data

Nov. 18, 2021    (CN) .......................... 202122837840.1

(51) Int. Cl.

| | |
|---|---|
| *H01M 50/264* | (2021.01) |
| *H01M 50/209* | (2021.01) |
| *H01M 50/242* | (2021.01) |
| *H01M 50/507* | (2021.01) |
| *H01M 50/588* | (2021.01) |
| *H01M 50/593* | (2021.01) |

(52) U.S. Cl.
CPC ....... *H01M 50/264* (2021.01); *H01M 50/209* (2021.01); *H01M 50/242* (2021.01); *H01M 50/507* (2021.01); *H01M 50/588* (2021.01); *H01M 50/593* (2021.01)

(58) Field of Classification Search
None
See application file for complete search history.

(56) References Cited

U.S. PATENT DOCUMENTS

| | | | |
|---|---|---|---|
| 2008/0160395 A1 | 7/2008 | Okada et al. | |
| 2009/0202900 A1 | 8/2009 | Kuroda et al. | |
| 2013/0108908 A1 | 5/2013 | Omura et al. | |
| 2016/0141712 A1* | 5/2016 | Choi .................. | H01M 50/227 |
| | | | 320/112 |

FOREIGN PATENT DOCUMENTS

| | | |
|---|---|---|
| KR | 1020210048976 A | 5/2021 |
| WO | 2015152639 A1 | 10/2015 |

* cited by examiner

*Primary Examiner* — Wyatt P McConnell
(74) *Attorney, Agent, or Firm* — Maier & Maier, PLLC

(57) ABSTRACT

A cell fixing apparatus includes a first shell element, a second shell element, and a plurality of pressure-adding beams. The first shell element and the second shell element are relatively fixedly connected, the first shell element and the second shell element are disposed at intervals in a first direction, so that an accommodating cavity is provided between the first shell element and the second shell element, and the accommodating cavity is configured to accommodate the cell. The plurality of pressure-adding beams may be disposed on a surface of the first shell element that is away from the second shell element. The plurality of pressure-adding beams may include a first-type beam and a second-type beam. A size of the first-type beam in the first direction is greater than that of the second-type beam. The pressure-adding beams are used to limit deformation of the cell in the accommodating cavity.

20 Claims, 3 Drawing Sheets

CELL FIXING APPARATUS AND BATTERY MODULE

CROSS-REFERENCE TO RELATED APPLICATION

This application claims priority to Chinese Patent Application No. 202122837840.1, filed on Nov. 18, 2021, which is hereby incorporated by reference in its entirety.

TECHNICAL FIELD

The embodiments relate to the field of electric storage apparatuses, a cell fixing apparatus, and a battery module.

BACKGROUND

To resolve a problem of severe intermittence of large-scale photovoltaic power generation and wind power generation, with rapid decrease of battery costs, battery energy storage has been developed rapidly in both a power generation side and a power consumption side, and an installed capacity is also significantly increased due to characteristics of the battery energy storage, such as flexible application, high reliability and controllability, and high energy density. An existing battery module may have high volumetric energy density and a compact module. In addition, a cell in the battery module needs to run for a long time, and the cell stores and releases electric energy through electrochemical reaction. Relative positions of electrode plates in the cell have significant impact on the electrochemical reaction of the cell. However, with the use of the cell, the cell is prone to expansion and deformation, and the electrode plates in the cell are relatively far away, degrading performance of the cell.

SUMMARY

The embodiments may provide a cell fixing apparatus and a battery module, so as to facilitate stable operation of the cell.

A first aspect may provide a cell fixing apparatus, including a first shell element, a second shell element, and a plurality of pressure-adding beams. The first shell element and the second shell element are relatively fixedly connected, the first shell element and the second shell element are disposed at intervals in a first direction, so that an accommodating cavity is provided between the first shell element and the second shell element, and the accommodating cavity is configured to accommodate the cell. A plurality of connection areas may be disposed at intervals along a second direction on a surface of the first shell element that is away from the second shell element, the second direction is perpendicular to the first direction, and the pressure-adding beam may be fixed in a corresponding connection area. The plurality of pressure-adding beams may include a first-type beam and a second-type beam. A size of the first-type beam in the first direction is greater than that of the second-type beam.

The cell fixing apparatus fixes relative positions of a plurality of cells in the first direction by using the first shell element and the second shell element, and the pressure-adding beam may be selectively disposed in the corresponding connection area. The cell is prone to deformation during a life cycle of the cell. A deformed cell exerts pressure on the pressure-adding beam, and in turn, the pressure-adding beam exerts a reaction force on the cell to limit deformation of the cell, so that the cell can maintain its shape to operate more stably. A type of the pressure-adding beam is selected based on a characteristic of the cell, the first-type beam or the second-type beam is selected to be mounted in a corresponding connection area on the first shell element, so as to further improve flexibility of the first shell element and the second shell element for controlling the deformation of the cell. In other words, the first shell element and the second shell element can more flexibly cope with the deformation of the cell. The first-type beam may provide a greater reaction force in a local area than the second-type beam, so as to limit the deformation of the cell.

According to the first aspect, in a possible implementation, the plurality of pressure-adding beams may include a third-type beam and a fourth-type beam. A size of the third type in the second direction is greater than that of the fourth-type beam.

In this possible implementation, the cell fixing apparatus may select, based on the characteristic of the cell, the third-type beam or the fourth-type beam to be mounted in a corresponding connection area on the first shell element, so as to further improve flexibility of the first shell element and the second shell element for controlling the deformation of the cell. In other words, the first shell element and the second shell element can more flexibly cope with the deformation of the cell. The third-type beam may provide a reaction force in a larger area in comparison with the fourth-type beam, so as to limit the deformation of the cell.

According to the first aspect, in a possible implementation, the cell fixing apparatus further includes a plurality of bracings, the first shell element and the second shell element are connected by using a plurality of bracings, the bracing extends along the first direction, and a surface of the bracing has an insulation layer.

In this possible implementation, in the cell fixing apparatus, insulation of the surface of the bracing can increase a creepage distance between cells.

According to the first aspect, in a possible implementation, the plurality of bracings may include a first-type bracing and a second-type bracing. A size of the first-type bracing in the second direction and/or a third direction is greater than that of the second-type bracing, and the third direction is perpendicular to the first direction and the second direction.

In this possible implementation, on a cross section perpendicular to the first direction, a cross-sectional area of the first-type bracing is larger than a cross-sectional area of the second-type bracing, so that the first-type bracing provides greater tension in the first direction in comparison with the second-type bracing, and provides a greater reaction force for the cell in the accommodating cavity, so as to limit the deformation of the cell.

According to the first aspect, in a possible implementation, the cell fixing apparatus further includes a third shell element and a fourth shell element, the third shell element and the fourth shell element are disposed at intervals in a third direction, the third direction is perpendicular to the first direction and the second direction, and the accommodating cavity is located between the third shell element and the fourth shell element.

In this possible implementation, in the cell fixing apparatus, the third shell element and the fourth shell element may cover two ends of the cell in the third direction, so as to provide more comprehensive protection for the cell.

According to the first aspect, in a possible implementation, the cell fixing apparatus further includes a first busbar, and the first busbar is disposed on a surface of the third shell element that is close to the fourth shell element. The first busbar is configured to correspond to a tab of the cell.

In this possible implementation, the cell whose tab faces the third shell element is disposed in the cell fixing apparatus, and the first busbar cooperates with the cell to electrically connect the plurality of cells.

According to the first aspect, in a possible implementation, a first insulation part is disposed between the first busbar and the third shell element, and the first insulation part insulates and isolates the first busbar and the third shell element.

In this possible implementation, in the cell fixing apparatus, insulation performance of the third shell element can be increased by using the first insulation part, so as to improve safety of the cell fixing apparatus.

According to the first aspect, in a possible implementation, the first insulation part includes an epoxy resin board.

In this possible implementation, the epoxy resin board is low in costs, easy to manufacture, and excellent in insulation performance.

According to the first aspect, in a possible implementation, the cell fixing apparatus further includes a second busbar, and the second busbar is disposed on a surface of the fourth shell element that is close to the third shell element. The second busbar is configured to correspond to the tab of the cell.

In this possible implementation, two cells whose tabs respectively face the third shell element and the fourth shell element are disposed in the cell fixing apparatus, and the first busbar and the second busbar cooperate with the cell to electrically connect the plurality of cells.

According to the first aspect, in a possible implementation, the cell fixing apparatus further includes a fifth shell element and a sixth shell element, the fifth shell element and the sixth shell element are disposed at intervals in the second direction, and the accommodating cavity is located between the fifth shell element and the sixth shell element. The fifth shell element is connected to the first shell element and the second shell element, and the sixth shell element is connected to the first shell element and the second shell element.

In this possible implementation, in the cell fixing apparatus, the fifth shell element and the sixth shell element may cover two ends of the cell in the second direction, so as to provide more comprehensive protection for the cell.

According to the first aspect, in a possible implementation, a first insulation film is disposed on a surface of the fifth shell element that is close to the sixth shell element, and a second insulation film is disposed on a surface of the sixth shell element that is close to the fifth shell element.

In this possible implementation, in the cell fixing apparatus, insulation performance of the fifth shell element and the sixth shell element can be increased by using the first insulation film and the second insulation film, so as to improve safety of the cell fixing apparatus.

A second aspect may provide a battery module, including a cell group and the cell fixing apparatus provided in the first aspect. The cell group includes a plurality of cells stacked along the first direction, and the cell group is disposed in the accommodating cavity of the cell fixing apparatus.

In this possible implementation, the cell fixing apparatus in the battery module provides a uniform reaction force for the cell to limit deformation of the cell, so that the cell can operate stably. In addition, reasonable distribution of pressure-adding beams enables the cell to maintain a stable shape in an entire life cycle through a reaction force of the pressure-adding beam.

According to the second aspect, in a possible implementation, the cell includes a first type cell or a second type cell. When the first type cell is accommodated in the accommodating cavity, the plurality of pressure-adding beams may be in a first distribution on a surface of the first shell element that is away from the second shell element. When the second type cell is accommodated in the accommodating cavity, the plurality of pressure-adding beams may be in a second distribution on a surface of the first shell element that is far away from the second shell element. A position of at least one of the pressure-adding beams varies in the first distribution and the second distribution.

In this possible implementation, a position for mounting the pressure-adding beam is selected based on a type of the cell. When the cell fixing apparatus accommodates the first type cell, the plurality of pressure-adding beams may be selected to be in the first distribution to adapt to a position at which the first type cell is prone to expansion. When the cell fixing apparatus accommodates the second type cell, the plurality of pressure-adding beams may be selected to be in the second distribution to adapt to a position at which the second type cell is prone to expansion.

According to the second aspect, in a possible implementation, a quantity of cell groups is at least two, and the at least two cell groups are disposed in parallel along the second direction.

In this possible implementation, the cell fixing apparatus can be additionally provided with more cells for a same size in the first direction.

The following embodiments are described with reference to the foregoing accompanying drawings.

DETAILED DESCRIPTION OF THE EMBODIMENTS

Implementations are described below in the embodiments, and other advantages and effects may be readily understood by a person skilled in the art from content in the embodiments. Although the description is provided with reference to the embodiments, this does not mean that features are limited to this implementation. On the contrary, a purpose of the description is to cover another option or modification that may be derived according to the embodiments. For an in-depth understanding, the following description includes many details. The embodiments may be alternatively implemented without using these details. In addition, to avoid confusion or obfuscation, some details are omitted from the description. It should be noted that the embodiments may be mutually combined in the case of no conflict.

The following terms "first", "second", and the like are merely used for description, and shall not be understood as an indication or implication of relative importance or implicit indication of a quantity of indicated features. Therefore, a feature limited by "first", "second", or the like may explicitly indicate or implicitly include one or more of the features. In the descriptions, unless otherwise stated, "a plurality of" means two or more than two. Orientation terms such as "up", "down", "left" and "right" are defined with respect to orientations of components that are schematically placed in accompanying drawings, and it should be understood that these directional terms are relative concepts, are used for relative description and clarification, and may vary accordingly based on a change in the orientation in which the components are disposed in the accompanying drawings.

If used, unless otherwise expressly specified and limited, the term "connection" should be understood in a broad sense, for example, "connection" may be a fixed connection, may be a detachable connection, or may be an integral connection; or "connection" may be a direct connection or an indirect connection by using an intermediate medium. As used herein, term "and/or" includes any and all combinations of one or more related listed items.

When the following embodiments are described in detail with reference to schematic diagrams, for ease of description, a diagram indicating a partial structure of a device is not partially enlarged in accordance with a general scale. In addition, the schematic diagrams are merely examples, and should not limit a scope of the embodiments.

To make the objectives, solutions, and advantages clearer, the following further describes the embodiments in detail with reference to the accompanying drawings.

Figure 1:
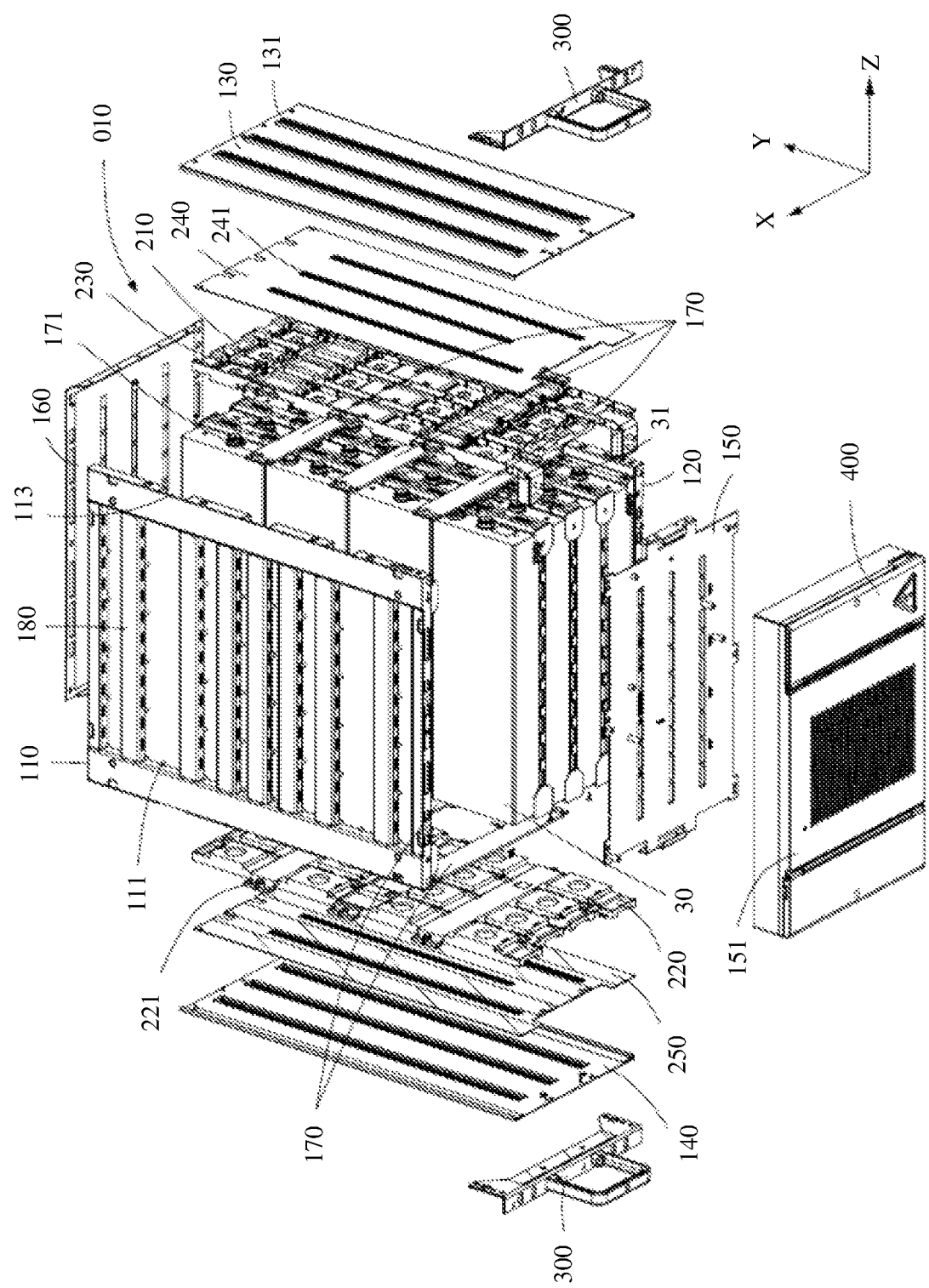
FIG. 1 is an exploded view of a battery module according to an implementation.

FIG. 1 is an exploded view of a battery module according to an implementation.

As shown in FIG. 1, the battery module includes a cell group and a cell fixing apparatus 010, and the cell group is fixed in the cell fixing apparatus 010. When the battery module is electrically connected to an external device, the battery module supplies electric energy to the external device by using the cell group.

The cell fixing apparatus 010 includes a first shell element 110 and a second shell element 120 that are disposed at intervals along a first direction X. The first shell element 110 and the second shell element 120 are connected by using a plurality of bracings 170, and the bracings 170 may maintain relative positions of the first shell element 110 and the second shell element 120. An accommodating cavity is provided between the first shell element 110 and the second shell element 120, and four cell groups are accommodated in the accommodating cavity, and pressure is exerted on the cell groups by using the first shell element 110 and the second shell element 120. The cell group includes four cells 030 stacked along the first direction X, the four cell groups are disposed in parallel along a second direction Y, and the second direction Y is perpendicular to the first direction X. In other words, sixteen cells 030 are mounted between the first shell element 110 and the second shell element 120. The cell 030 includes a package shell and an electrode plate (not shown in the figure), and electrode plates of the cell 030 are stacked along the first direction X. The electrode plate may include a positive electrode plate and a negative electrode plate, and the positive electrode plate and the negative electrode plate may be stacked crosswise along the first direction X, so as to implement discharging of the cell 030 through an electrochemical reaction. Deformation of the cell 030 exerts pressure on the first shell element 110 and the second shell element 120, and correspondingly, the first shell element 110 and the second shell element 120 exert a reaction force in the first direction X on the cell 030, so as to maintain a shape of the cell 030. When the shape of the cell 030 remains stable, two adjacent electrode plates in the cell 030 can be maintained at a relatively small spacing, so that the cell 030 can operate stably.

Both the first shell element 110 and the second shell element 120 are sheet metal parts, so that manufacturing costs of the first shell element 110 and the second shell element 120 are reduced, and the first shell element 110 and the second shell element 120 can have relatively high overall strength.

Figure 2:
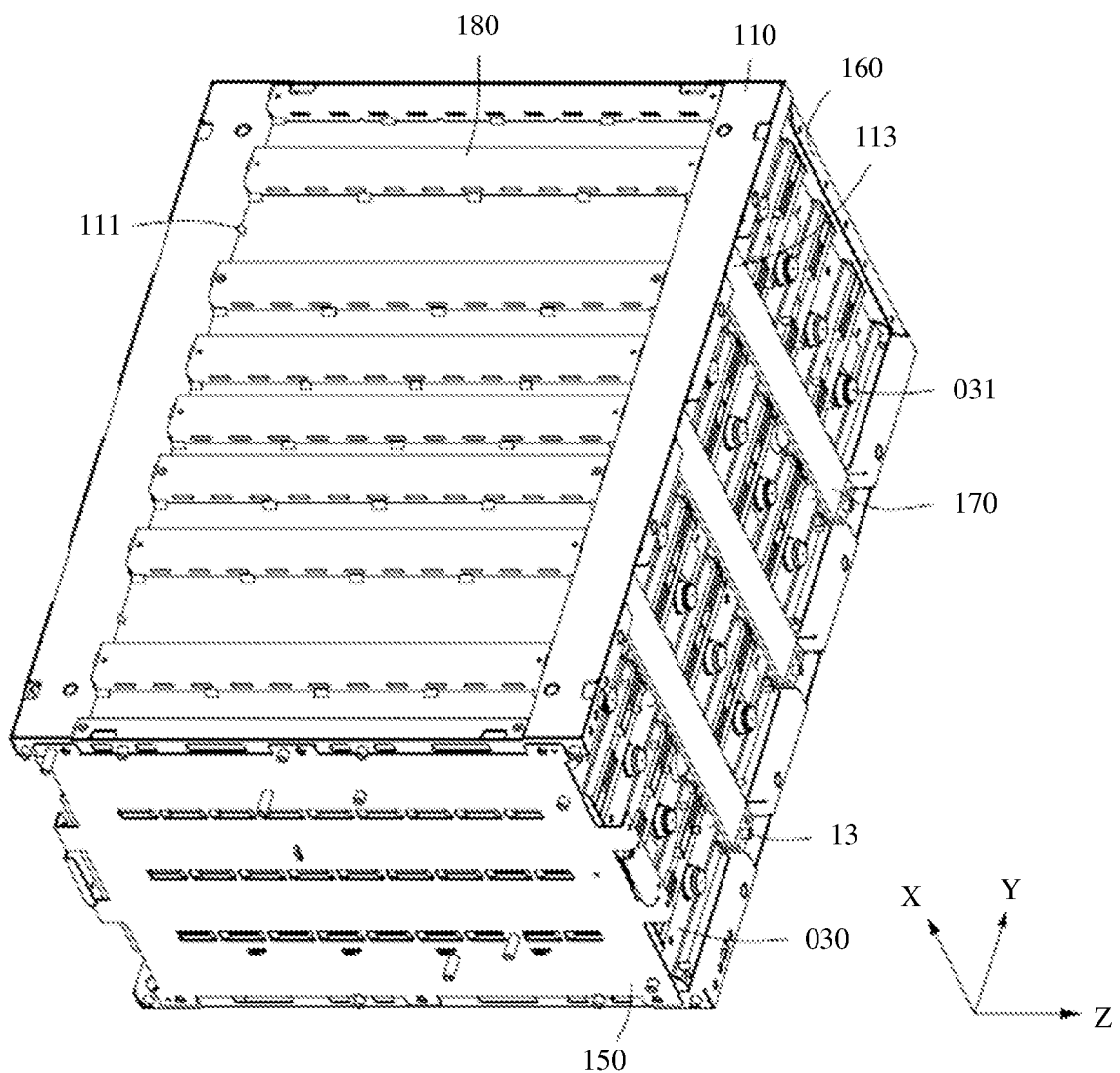
FIG. 2 is a schematic diagram of a structure of a first shell element and a second shell element holding a cell group according to an implementation.

FIG. 2 is a schematic diagram of a structure of a first shell element 110 and a second shell element 120 holding a cell group according to an implementation.

As shown in FIG. 1 and FIG. 2, cell fixing apparatus 010 further includes a plurality of pressure-adding beams 180, and the pressure-adding beams 180 may be fixed on a surface of a first shell element 110 that is away from a second shell element 120. When applied to different types of cells 030, a same cell fixing apparatus 010 may be provided with the pressure-adding beam 180 based on an actual requirement of the cell 030 of the type. However, even if a same type of cell 030 is used to cope with different batches or different elapsed years of the cell 030, a corresponding pressure-adding beam 180 may be mounted at a position of the cell 030 that requires a greater reaction force to limit deformation, so that the pressure-adding beam 180 can be suitably distributed in each cell 030 in the cell fixing apparatus 010. In addition, the pressure-adding beam 180 has relatively high strength and is not easily deformed and can exert a relatively great reaction force on the cell 030. When the cell 030 tends to expand as the use time extends, the pressure-adding beam 180 can limit such expansion, so that the electrode plates in the cell 030 are maintained at the relatively small spacing, thereby maintaining stable operation of the cell 030.

When a first type cell is selected as the cell 030 in the cell group, the plurality of pressure-adding beams 180 may be in a first distribution on a surface of the first shell element 110 that is away from the second shell element 120. For example, a center of the first type cell is prone to bulging, and the first distribution means that the pressure-adding beam 180 is disposed correspondingly at a position in the first shell element 110 that corresponds to the center of the first type cell. When a second type cell is selected as the cell 030 in the cell group, the plurality of pressure-adding beams 180 may be in a second distribution on the surface of the first shell element 110 that is away from the second shell element 120. For example, an edge of the second type cell is prone to bulging, and the second distribution means that the pressure-adding beam 180 is disposed correspondingly at a position in the first shell element 110 that corresponds to the edge of the second type cell.

A plurality of connection areas may be provided on the surface of the first shell element 110 that is away from the second shell element 120, and a connection area is used for mounting the pressure-adding beam 180. The first shell element 110 may be provided with a connector 111 at a position of the connection area, and the connector 111 may be configured to connect the pressure-adding beam 180. The connector 111 of each connection area may be a plurality of protrusions disposed at intervals along a third direction Z, and a protrusion forms a solder joint. The third direction Z is perpendicular to a first direction X and a second direction Y. The protrusion and the pressure-adding beam 180 are welded to fix the pressure-adding beam 180 on the first shell element 110.

The plurality of pressure-adding beams 180 may include a variety of types. The plurality of pressure-adding beams 180 may include a first-type beam and a second-type beam, and a size of the first-type beam in the first direction X may be greater than a size of the second-type beam in the first direction X. When the first-type beam and the second-type beam are subjected to same pressure from the cell 030 in the first direction X, deformation of the first-type beam may be less obvious than that of the second-type beam. Similarly, when the first-type beam and the second-type beam have same deformation, the first-type beam can exert a greater reaction force on the cell 030 in the first direction X in comparison with the second-type beam.

The plurality of pressure-adding beams 180 may further include a third-type beam and a fourth-type beam, and a size of the third-type beam in the second direction Y is greater than a size of the fourth-type beam in the second direction Y. In other words, when the third-type beam and the fourth-type beam are subjected to same pressure from the cell 030 in the first direction X, the third-type beam can exert a reaction force on the cell 030 in a larger coverage area in comparison with the fourth-type beam. In addition, the third-type beam is relatively less prone to deformation, and when a same quantity of third-type beams or fourth-type beams are disposed on the first shell element 110, the third-type beam can exert a greater reaction force on the cell 030.

The first-type beam may also belong to the third-type beam, that is, sizes of some first-type beams in the second direction Y may be greater than sizes of some second-type beams. The first-type beam may also belong to the fourth-type beam, that is, sizes of some first-type beams in the second direction Y are smaller than sizes of some second-type beams.

A bracing 170 may use a strip sheet metal part, so that the bracing 170 has relatively high strength and relatively low manufacturing costs. A tab 031 of the cell 030 extends out of a package shell of the cell 030 along the third direction Z, and a distance between the tab 031 of the cell 030 and the bracing 170 is relatively close. An insulation layer is disposed outside the bracing 170, so as to effectively increase a creepage distance between the cells 030.

The first shell element 110 is provided with a first locating slot 113 at two opposite ends in the third direction Z, and the first shell element 110 is provided with a first fixing member at a position of the first locating slot 113. The second shell element 120 is provided with a second locating slot at two opposite ends in the third direction Z, and the second shell element 120 is provided with a second fixing member at a position of the second locating slot. One end of the bracing 170 is embedded into the first locating slot 113, so as to preliminarily position the bracing 170 and the first shell element 110. The bracing 170 is connected to a corresponding first fixing member, so as to fix the bracing 170 and the first shell element 110. The other end of the bracing 170 is embedded into the second locating slot, so as to preliminarily position the bracing 170 and the second shell element 120. The bracing 170 is connected to a corresponding second fixing member, so as to fix the bracing 170 and the second shell element 120. After connected to the first shell element 110 and the second shell element 120, the bracing 170 extends roughly along the first direction X.

The first fixing member may be a tapped hole and the second fixing member may be a tapped hole. A third fixing member corresponding to the first fixing member and a fourth fixing member corresponding to the second fixing member are disposed on the bracing 170. Both the third fixing member and the fourth fixing member are through holes. When connecting the bracing 170 and the first shell element 110, a first bolt 171 passes through the corresponding third fixing member on the bracing 170, and then is in threaded fitting with the first fixing member. When connecting the bracing 170 and the second shell element 120, a second bolt 173 passes through the corresponding fourth fixing member on the bracing 170, and then is in threaded fitting with the second fixing member. A plurality of first fixing members on the first shell element 110 may correspond to a same bracing 170, and the same bracing 170 and the first shell element 110 may be connected by using a plurality of first bolts 171, so that connection strength between the first shell element 110 and the bracing 170 can be increased. Similarly, a plurality of second fixing members on the second shell element 120 may correspond to a same bracing 170, and the same bracing 170 and the second shell element 120 may be connected by using a plurality of second bolts 173, so that connection strength between the second shell element 120 and the bracing 170 can be increased.

Selection of the bracing 170 can also affect the force exerted on the cell 030. When the first shell element 110 and the second shell element 120 are subjected to same tension so that the first shell element 110 and the second shell element 120 tend to be relatively far away, if strength of the bracing 170 is relatively high, the first shell element 110 and the second shell element 120 that are connected by the bracing 170 are not prone to being relatively far away, and if the strength of the bracing 170 is relatively low, the bracing 170 is more prone to deformation so that the first shell element 110 and the second shell element 120 are relatively far away.

A plurality of bracings 170 may include a first-type bracing and a second-type bracing. Sizes of the first-type bracing and the second-type bracing in the third direction Z are the same, and a size of the first-type bracing in the second direction Y is greater than a size of the second-type bracing. On a cross section perpendicular to the first direction X, a cross-sectional area of the first-type bracing is larger than a cross-sectional area of the second-type bracing, so that the first-type bracing can provide greater tension for the first shell element 110 and the second shell element 120, so as to prevent the first shell element 110 and the second shell element 120 from being relatively far away. When used, the first-type bracing can cope with greater pressure from the cell 030, that is, provide a greater reaction force to limit deformation of the cell 030. To cope with a cell 030 that may have relatively large deformation during a life cycle, use of the first-type bracing enables the cell 030 to have a more stable operating condition.

It can be understood that the size of the first-type bracing may be alternatively set in the third direction Z to be greater than the size of the second-type bracing, so that on the cross section perpendicular to the first direction X, the cross-sectional area of the first-type bracing is also larger than the cross-sectional area of the second-type bracing. Therefore, the first-type bracing can provide greater tension for the first shell element 110 and the second shell element 120, so as to prevent the first shell element 110 and the second shell element 120 from being relatively far away. When used, the first-type bracing can cope with greater pressure from the cell 030, that is, provide a greater reaction force to limit the deformation of the cell 030.

A battery module selects the corresponding pressure-adding beam 180 and bracing 170 based on the actual requirement of the cell 030, so that the cell 030 can have a relatively stable shape in an entire life cycle. A spacing between the electrode plates of the cell 030 in the entire life cycle can be kept stable, so that the cell 030 can output relatively stable electric energy. Similarly, if the cell 030 is a rechargeable cell 030, in the entire life cycle of the cell 030, a stable electric energy input can be maintained in each charging process, so as to maintain the stable operation of the cell 030.

When the cell 030 module is actually applied, if a cell 030 that is not prone to deformation is used, the cell 030 itself does not exert too much pressure on the first shell element 110 and the second shell element 120, and the first shell element 110 and the second shell element 120 do not need to provide a great reaction force to limit the deformation of the cell 030. In this case, only the pressure-adding beam 180 needs to be disposed in the connection area on the first shell element 110, so that each cell group corresponds to one pressure-adding beam 180. The second-type beam and the fourth-type beam may also be selected as the pressure-adding beam 180, and the second-type beam and the fourth-type beam can provide a sufficient reaction force for the cell 030, so as to limit the deformation of the cell 030. The second-type bracing may also be used as the bracing 170, and the second-type bracing can generate sufficient tension to provide a sufficient reaction force for the cell 030, so as to limit the deformation of the cell 030.

When the cell 030 module is actually applied, if a cell 030 that is prone to deformation as a whole in the life cycle is used, as many pressure-adding beams 180 as possible may be laid in the connection area on the first shell element 110, so that each cell group corresponds to a plurality of pressure-adding beams 180, and the pressure-adding beams 180 cover an entire surface of the first shell element 110 as far as possible. The third-type beam may also be selected as the pressure-adding beam 180, and the third-type beam can provide a reaction force for the cell 030 over a larger area, so as to limit the deformation of the cell 030.

When the cell 030 module is actually applied, if a cell 030 that is prone to partial severe deformation in the life cycle is used, the pressure-adding beam 180 may be disposed in a connection area corresponding to the deformation of the cell 030 on the first shell element 110, and the first-type beam may be selected as the pressure-adding beam 180, so that the first-type beam can provide a great reaction force to suppress the deformation of the cell 030. The first-type bracing may also be used as the bracing 170, and the first-type bracing can generate greater tension and provide a sufficient reaction force for the cell 030, so as to limit the deformation of the cell 030.

The cell fixing apparatus 010 further includes a third shell element 130 and a fourth shell element 140. Both the third shell element 130 and the fourth shell element 140 are sheet metal parts, so that manufacturing costs of the third shell element 130 and the fourth shell element 140 are reduced, and the third shell element 130 and the fourth shell element 140 can have relatively high overall strength.

The third shell element 130 and the fourth shell element 140 are disposed at intervals in the third direction Z, and the first shell element 110, the second shell element 120, the third shell element 130, and the fourth shell element 140 jointly form an accommodating cavity.

The cell fixing apparatus 010 further includes a first busbar support 210, a first busbar 230, a second busbar support 220, and a second busbar. The first busbar support 210 is disposed between the third shell element 130 and the cell group, the cell 030 has a tab 031 facing the third shell element 130, and the cell 030 further has a tab 031 facing the fourth shell element 140.

The first busbar support 210 is provided with a fifth fixing member 211, some fifth fixing members 211 correspond to the first fixing members, and the other fifth fixing members 211 correspond to the second fixing members. When the first shell element 110, the second shell element 120, and the bracing 170 are mounted, the first busbar support 210 may also be mounted together. The fifth fixing member 211 may be a through hole. After the first bolt 171 passes through a fifth fixing member 211 corresponding to the first fixing member and the third fixing member on the bracing 170, the first bolt 171 is in threaded fitting with the first fixing member. After the second bolt 173 passes through a fifth fixing member 211 corresponding to the second fixing member and the fourth fixing member on the bracing 170, the second bolt 173 is in threaded fitting with the second fixing member.

The second busbar support 220 is provided with a sixth fixing member 221, some sixth fixing members 221 correspond to the first fixing members, and the other sixth fixing members 221 correspond to the second fixing members. When the first shell element 110, the second shell element 120, and the bracing 170 are mounted by using a bolt, the second busbar support 220 may also be mounted together.

A connection hole is provided at a position on the first busbar support 210 that corresponds to the tab 031. The first busbar 230 is mounted to a position on the first busbar support 210 that corresponds to the connection hole. Tabs 031 that face the third shell element 130 and that are of cells 030 in the cell group are electrically connected by using the first busbar 230.

Similarly, a connection hole is provided at a position on the second busbar support 220 that corresponds to the tab 031. The second busbar is mounted to a position on the second busbar support 220 that corresponds to the connection hole. Tabs 031 that face the fourth shell element 140 and that are of cells 030 in the cell group are electrically connected by using the second busbar.

Both the first busbar support 210 and the second busbar support 220 are insulation brackets, so that a probability of incorrect electrical connection between electrodes can be reduced.

According to an actual requirement for use, two adjacent cells 030 may be connected in series by using the first busbar 230 and the second busbar, or two adjacent cells 030 may be connected in parallel by using the first busbar 230 and the second busbar.

It can be understood that, if both of two tabs 031 of the cell 030 face the third shell element 130, the second busbar support 220 and the second busbar may not be disposed, and the cells 030 in the cell group can be connected in series or in parallel only by using the first busbar 230.

Figure 3:
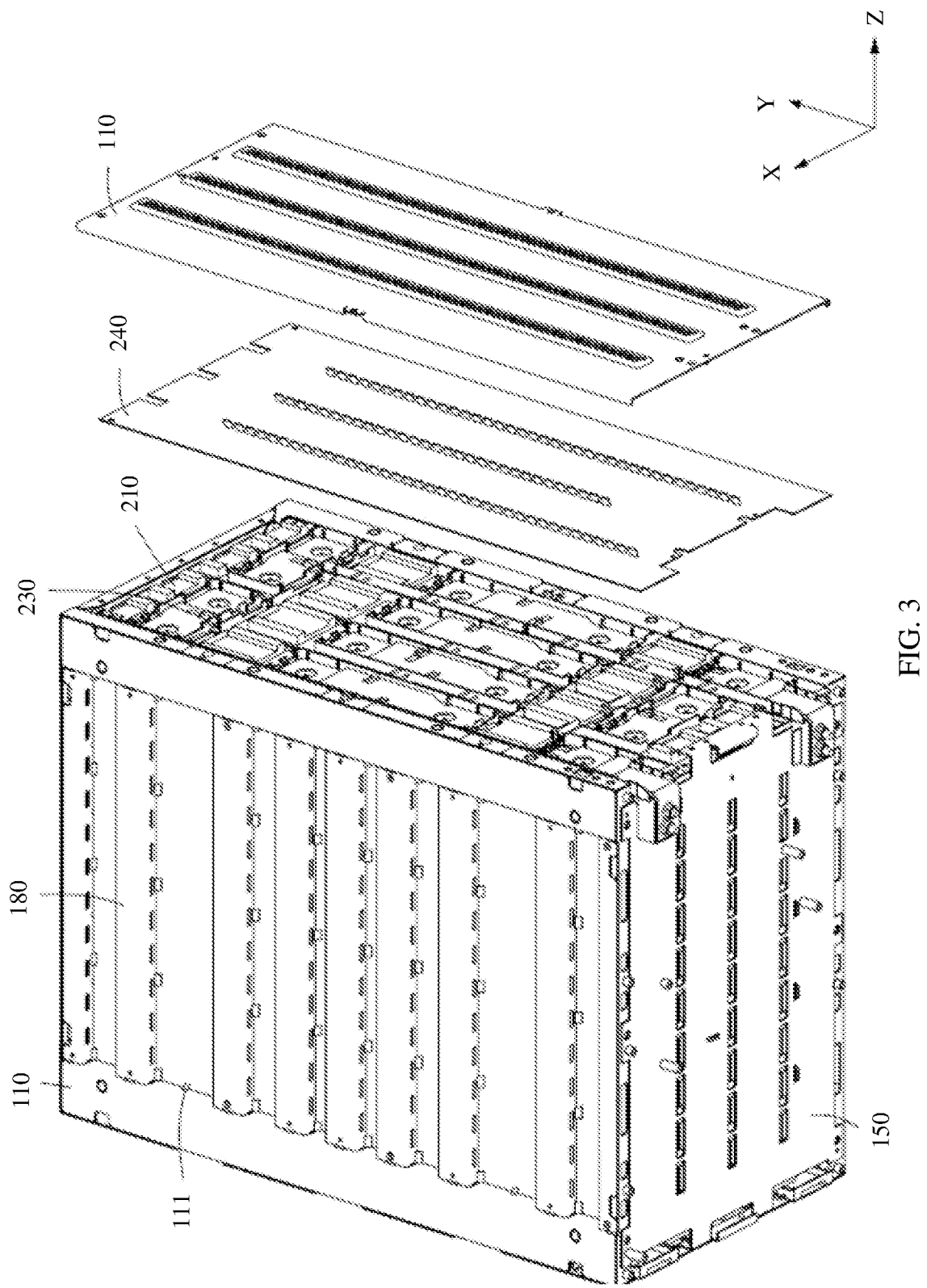
FIG. 3 is an exploded view of a battery module according to an implementation, where a first shell element and a first insulation part are obtained by decomposing the battery module.

FIG. 3 is an exploded view of a battery module according to an implementation, where a first shell element 110 and a first insulation part 240 are obtained by decomposing the battery module.

Referring to FIG. 1 and FIG. 3, a cell fixing apparatus 010 further includes a first insulation part 240 and a second insulation part 250. The first insulation part 240 is disposed between a first busbar 230 and a third shell element 130. By using the first insulation part 240, the first busbar 230 and the third shell element 130 are disposed at intervals, and the first busbar 230 is not in contact with the third shell element 130 at a minimum. The first insulation part 240 is used to insulate and isolate the first busbar 230 from the third shell element 130, so as to reduce a probability that the third shell element 130 is energized and improve safety of the battery module.

Similarly, the second insulation part 250 is disposed between a second busbar and a fourth shell element 140. By using the second insulation part 250, the second busbar and the fourth shell element 140 are disposed at intervals, and the second busbar is not in contact with the fourth shell element 140 at a minimum. The second insulation part 250 is used to insulate and isolate the second busbar from the fourth shell element 140, so as to reduce a probability that the fourth shell element 140 is energized and improve safety of the battery module.

Both the first insulation part 240 and the second insulation part 250 may use an epoxy resin board. The epoxy resin board is low in costs, easy to manufacture, and excellent in insulation performance.

It can be understood that the first insulation part 240 and the second insulation part 250 may be alternatively made of another insulation material, so that the first insulation part 240 and the second insulation part 250 are insulated from each other on two opposite sides in a third direction Z.

A plurality of first air holes 241 may be further provided on the first insulation part 240 and the second insulation part 250, and a first air hole 241 can be used to increase heat dissipation efficiency of the battery module and reduce a temperature of the battery module when the battery module operates.

A second air hole 131 is provided on the third shell element 130 and the fourth shell element 140, the second air hole 131 corresponds to the first air hole 241, and heat generated by the cell 030 causes surrounding gas to heat up. Heated gas leaves the battery module through the first air hole 241 and the second air hole 131, so that heat of the battery module is dissipated.

The cell fixing apparatus 010 further includes a fifth shell element 150 and a sixth shell element 160. Both the fifth shell element 150 and the sixth shell element 160 are sheet metal parts, so that manufacturing costs of the fifth shell element 150 and the sixth shell element 160 are reduced, and the fifth shell element 150 and the sixth shell element 160 can have relatively high overall strength.

The fifth shell element 150 and the sixth shell element 160 are disposed at intervals in a second direction Y, and the first shell element 110, the second shell element 120, the third shell element 130, the fourth shell element 140, the fifth shell element 150, and the sixth shell element 160 jointly form a roughly cubic accommodating cavity.

The fifth shell element 150 is fixedly connected to the first shell element 110 and the second shell element 120. The sixth shell element 160 is fixedly connected to the first shell element 110 and the second shell element 120. The fifth shell element 150 and the sixth shell element 160 may cover two ends of the cell 030 in the second direction Y, so as to provide more comprehensive protection for the cell 030.

The fifth shell element 150 and the sixth shell element 160 further have a flange extending along the second direction Y, and the flange is provided with a first fixing hole. A second fixing hole is provided on the third shell element 130 and the fourth shell element 140, and the second fixing hole corresponds to the first fixing hole. The first fixing hole and the second fixing hole are matched by using a bolt, so that the fifth shell element 150 is connected to the third shell element 130 and the fourth shell element 140, and the sixth shell element 160 is connected to the third shell element 130 and the fourth shell element 140. In this way, integrity of the cell fixing apparatus 010 is enhanced, and connections among the first shell element 110, the second shell element 120, the third shell element 130, the fourth shell element 140, the fifth shell element 150, and the sixth shell element 160 are more stable.

A heat dissipation hole 151 is provided on the fifth shell element 150 and the sixth shell element 160, and the heat generated by the cell 030 in the accommodating cavity may be dissipated out of the accommodating cavity through the heat dissipation hole 151.

The cell fixing apparatus 010 further includes two handles 300, where one handle 300 is fixedly connected to the third shell element 130, and the other handle 300 is fixedly connected to the fourth shell element 140. When the battery module needs to be transported, a user may hold the handle 300 to apply force.

The battery module further includes a BMS 400 (Battery Management System, battery management system). The BMS 400 is mounted on a surface of the fifth shell element 150 that is away from the sixth shell element 160. The BMS 400 is electrically connected to a cell group, and the cell 030 may be managed by using the BMS 400, so that the cell 030 is in a proper operating state.

It can be understood that the battery module may also be used for a plurality of devices and apparatuses, for example, power supply for a mobile base station, and power supply for a transportation means such as a vehicle or a speedboat.

The battery module provides a first shell element 110 and a second shell element 120 that match the cell 030 for a corresponding cell 030 by using the cell fixing apparatus, and deformation of the cell 030 is limited by using the first shell element 110 and the second shell element 120, so that the cell 030 can be in a stable operating state.

The foregoing description is merely implementations, but is not intended to limit the scope of the embodiments. Any variation or replacement within shall fall within the scope of the embodiments.

What is claimed is:

1. A cell fixing apparatus, comprising:
    a first shell element;
    a second shell element, wherein the first shell element and the second shell element are relatively fixedly connected, the first shell element and the second shell element are disposed at intervals in a first direction, so that an accommodating cavity is provided between the first shell element and the second shell element, and the accommodating cavity is configured to accommodate the cell;
    a plurality of pressure-adding beams are disposed at intervals in a second direction, wherein the second direction is perpendicular to the first direction, and the plurality of pressure-adding beams are disposed on a surface of the first shell element that is away from the second shell element; the plurality of pressure-adding beams comprise:
    a first-type beam and a second-type beam; and a size of the first-type beam in the first direction is greater than that of the second-type beam; and
    a plurality of bracings comprising a first-type bracing and a second-type bracing, a size of the first-type bracing in the second direction and/or a third direction is greater than that of the second-type bracing, and the third direction is perpendicular to the first direction and the second direction.

2. The cell fixing apparatus according to claim 1, wherein the plurality of pressure-adding beams further comprises:
    a third-type beam and a fourth-type beam; and a size of the third-type beam in the second direction is greater than that of the fourth-type beam.

3. The cell fixing apparatus according to claim 1, wherein the first shell element and the second shell element are connected by using the plurality of bracings, the bracing extends along the first direction, and a surface of the bracing has an insulation layer.

4. The cell fixing apparatus according to claim 1, further comprising:
a third shell element and a fourth shell element, wherein the third shell element and the fourth shell element are disposed at intervals in a third direction, the third direction is perpendicular to the first direction and the second direction, and the accommodating cavity is located between the third shell element and the fourth shell element.

5. The cell fixing apparatus according to claim 4, further comprising:
a first busbar disposed on a surface of the third shell element that is close to the fourth shell element, wherein the first busbar is configured to correspond to a tab of the cell.

6. The cell fixing apparatus according to claim 5, wherein a first insulation part is disposed between the first busbar and the third shell element, and the first insulation part is configured to insulate and isolate the first busbar and the third shell element.

7. The cell fixing apparatus according to claim 6, wherein the first insulation part comprises an epoxy resin board.

8. The cell fixing apparatus according to claim 5, further comprising:
a second busbar disposed on a surface of the fourth shell element that is close to the third shell element, wherein the second busbar is configured to correspond to the tab of the cell.

9. The cell fixing apparatus according to claim 1, further comprising:
a fifth shell element and a sixth shell element, wherein the fifth shell element and the sixth shell element are disposed at intervals in the second direction, and the accommodating cavity is located between the fifth shell element and the sixth shell element; and the fifth shell element is connected to the first shell element and the second shell element, and the sixth shell element is connected to the first shell element and the second shell element.

10. The cell fixing apparatus according to claim 9, wherein a first insulation film is disposed on a surface of the fifth shell element that is close to the sixth shell element, and a second insulation film is disposed on a surface of the sixth shell element that is close to the fifth shell element.

11. A battery module, comprising:
a cell group comprising a plurality of cells stacked along a first direction; and
a cell fixing apparatus, wherein the cell group is disposed in an accommodating cavity of the cell fixing apparatus; the cell fixing apparatus, comprises:
a first shell element;
a second shell element, wherein the first shell element and the second shell element are relatively fixedly connected, the first shell element and the second shell element are disposed at intervals in a first direction, so that an accommodating cavity is provided between the first shell element and the second shell element, and the accommodating cavity is configured to accommodate the cell;
a plurality of pressure-adding beams disposed at intervals in a second direction, wherein the second direction is perpendicular to the first direction, and the plurality of pressure-adding beams are disposed on a surface of the first shell element that is away from the second shell element; the plurality of pressure-adding beams comprise:
a first-type beam and a second-type beam; and a size of the first-type beam in the first direction is greater than that of the second-type beam; and
a plurality of bracings comprising a first-type bracing and a second-type bracing, a size of the first-type bracing in the second direction and/or a third direction is greater than that of the second-type bracing, and the third direction is perpendicular to the first direction and the second direction.

12. The battery module according to claim 11, further comprising:
a first type cell or a second type cell;
when the first type cell is accommodated in the accommodating cavity, the plurality of pressure-adding beams is in a first distribution on a surface of the first shell element that is away from the second shell element;
or when the second type cell is accommodated in the accommodating cavity, the plurality of pressure-adding beams is in a second distribution on a surface of the first shell element that is away from the second shell element; and a position of at least one of the pressure-adding beams varies in the first distribution and the second distribution.

13. The battery module according to claim 11, wherein a quantity of cell groups is at least two, and the at least two cell groups are disposed in parallel along the second direction.

14. The battery module according to claim 11, further comprising:
a third shell element and a fourth shell element, wherein the third shell element and the fourth shell element are disposed at intervals in a third direction, the third direction is perpendicular to the first direction and the second direction, and the accommodating cavity is located between the third shell element and the fourth shell element.

15. The battery module according to claim 14, further comprising:
a first busbar disposed on a surface of the third shell element that is close to the fourth shell element and configured to correspond to a tab of the cell.

16. The battery module according to claim 15, wherein a first insulation part is disposed between the first busbar and the third shell element, and the first insulation part is configured to insulate and isolate the first busbar and the third shell element, wherein the first insulation part comprises an epoxy resin board.

17. The battery module according to claim 16, further comprising:
a fifth shell element and a sixth shell element, the fifth shell element and the sixth shell element are disposed at intervals in the second direction, the accommodating cavity is located between the fifth shell element and the sixth shell element, the fifth shell element is connected to the first shell element and the second shell element, and the sixth shell element is connected to the first shell element and the second shell element.

18. The battery module according to claim 17, wherein a first insulation film is disposed on a surface of the fifth shell element that is close to the sixth shell element, and a second insulation film is disposed on a surface of the sixth shell element that is close to the fifth shell element.

19. The battery module according to claim 15, further comprising:
a second busbar disposed on a surface of the fourth shell element that is close to the third shell element, wherein the second busbar is configured to correspond to the tab of the cell.

20. The battery module according to claim 11, wherein the first shell element and the second shell element are connected by using the plurality of bracings, the bracing extends along the first direction, and a surface of the bracing has an insulation layer.

* * * * *